Patented Dec. 26, 1933                                                   1,940,660

UNITED STATES PATENT OFFICE 1,940,660

DIRESORCIN ISATIN

Walter G. Christiansen, Glen Ridge, N. J., and Sidney E. Harris, Brooklyn, N. Y., assignors to E. R. Squibb & Sons, Brooklyn, N. Y., a corporation of New York No Drawing. Application March 9, 1932
Serial No. 597,80?

3 Claims. (Cl. 260—48)

This invention relates to diresorcin isatin.

We have found this compound to be important as an intermediate in the preparation of valuable therapeutic compounds.

Diresorcin isatin may be prepared by suspending 5.6 gms. of isatin and 8.2 gms. of resorcin in 50 cc. of glacial acetic acid. The mixture is thoroughly agitated, then concentrated sulfuric acid is added slowly, drop by drop, until the mixture is homogeneous and the isatin color is entirely replaced by a clear deep red. The mixture is poured into 500 cc. of cold water and a small quantity of sodium acetate is added. After standing for some time the precipitated diresorcin isatin is filtered off, washed with water and dried at 60 to 80° C. The white solid so formed melts above 270° C.

On analysis, the compound has been found to have the formula, $$C_{20}H_{15}NO_5$$

and is, therefore, represented by the formula:

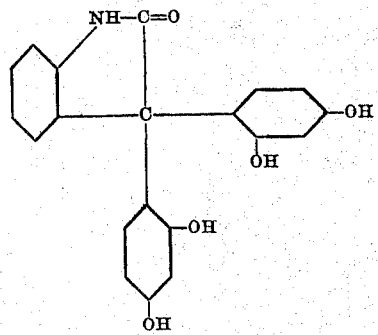

The substance readily loses water when acted upon by dehydrating agents forming a closed ring structure:

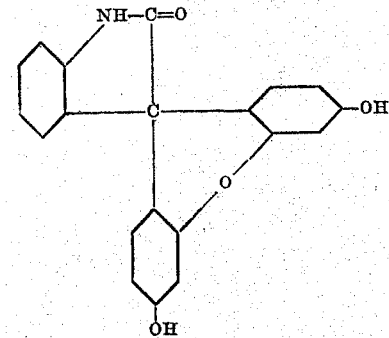

We claim:

1. A compound:

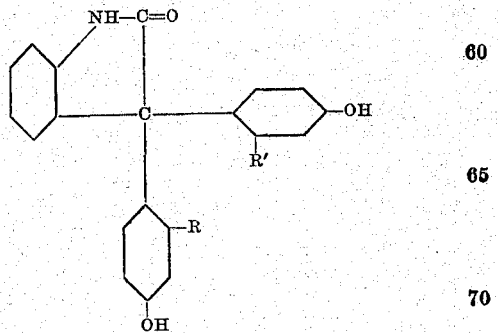

where R and R' are both OH, or jointly —O—.

2. The compound:

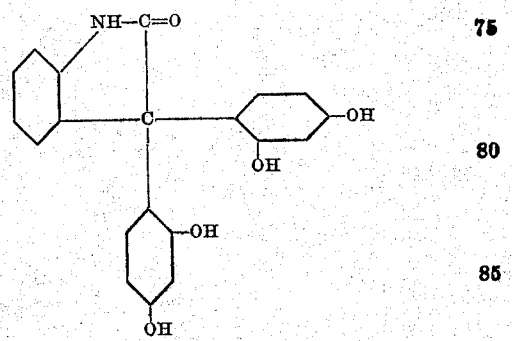

3. The compound:

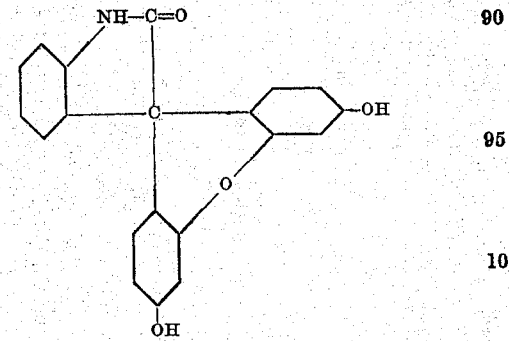

WALTER G. CHRISTIANSEN.
SIDNEY E. HARRIS.